United States Patent
Ikeda et al.

(10) Patent No.: US 11,486,327 B2
(45) Date of Patent: Nov. 1, 2022

(54) CONTROL DEVICE AND CONTROL METHOD OF INTERNAL COMBUSTION ENGINE

(71) Applicant: TOYOTA JIDOSHA KABUSHIKI KAISHA, Aichi-ken (JP)

(72) Inventors: Yuto Ikeda, Okazaki (JP); Yuki Nose, Nagoya (JP); Takanobu Gotoh, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/676,227

(22) Filed: Feb. 21, 2022

(65) Prior Publication Data
US 2022/0307441 A1 Sep. 29, 2022

(30) Foreign Application Priority Data
Mar. 26, 2021 (JP) .............................. JP2021-053933

(51) Int. Cl.
*F02D 41/02* (2006.01)
*F02D 41/24* (2006.01)
*F02D 41/14* (2006.01)
*F02D 41/00* (2006.01)

(52) U.S. Cl.
CPC ..... *F02D 41/2454* (2013.01); *F02D 41/0032* (2013.01); *F02D 41/0055* (2013.01); *F02D 41/025* (2013.01); *F02D 41/027* (2013.01); *F02D 41/1454* (2013.01); *F02D 41/1475* (2013.01); *F02D 2250/11* (2013.01)

(58) Field of Classification Search
CPC ............... F02D 41/0055; F02D 41/003; F02D 41/0032; F02D 41/027; F02D 41/0275; F02D 41/028; F02D 41/0285; F02D 41/029; F02D 41/0295; F02D 2250/11
USPC .......... 60/285, 286, 295; 123/395, 585, 572, 123/698
See application file for complete search history.

(56) References Cited

U.S. PATENT DOCUMENTS 8,504,280 B2 * 8/2013 Douglas .................. F01N 3/025
60/277
2008/0022655 A1 * 1/2008 Forth .................... F02D 41/028
60/274

(Continued)

FOREIGN PATENT DOCUMENTS

JP 2007127076 A 5/2007

*Primary Examiner* — Erick R Solis
(74) *Attorney, Agent, or Firm* — Hauptman Ham, LLP (57) ABSTRACT

A control device of an internal combustion engine including an electronic control unit configured to execute: a base injection amount calculation process of calculating a base value; an injection valve operation process of operating the fuel injection valve; a feedback process of correcting an injection amount in the injection valve operation process; and a determination process of determining whether or not the amount of fuel flowing into the cylinders other than fuel injected from the fuel injection valve is equal to or larger than a threshold value. When it is determined as a result of the determination that the amount of fuel flowing into the cylinders other than the fuel injected from the fuel injection valve is equal to or larger than the threshold value, the electronic control unit (does not execute the process of injecting fuel from the fuel injection valve with the feedback process stopped.

9 Claims, 5 Drawing Sheets

(56) References Cited

U.S. PATENT DOCUMENTS

| | | | | |
|---|---|---|---|---|
| 2011/0139136 A1* | 6/2011 | Guo | ......................... | F02D 9/04 |
| | | | | 123/676 |
| 2014/0013727 A1* | 1/2014 | Schneider | ........... | F02D 41/3005 |
| | | | | 60/274 |
| 2014/0311447 A1* | 10/2014 | Surnilla | ............. | G01N 33/2852 |
| | | | | 123/344 |

* cited by examiner

CONTROL DEVICE AND CONTROL METHOD OF INTERNAL COMBUSTION ENGINE

CROSS-REFERENCE TO RELATED APPLICATION

This application claims priority to Japanese Patent Application No. 2021-053933 filed on Mar. 26, 2021, incorporated herein by reference in its entirety.

BACKGROUND

1. Technical Field

The disclosure relates to a control device and a control method of an internal combustion engine.

2. Description of Related Art

For example, Japanese Unexamined Patent Application Publication No. 2007-127076 describes a device that grasps the flow volume of blow-by gas based on a correction amount of air-fuel ratio feedback control.

SUMMARY

The present inventor considered executing a regeneration process of a post-processing device while a shaft torque of an internal combustion engine is not zero. Specifically, the present inventor considered, as the regeneration process, supplying unburned fuel and oxygen into exhaust gas by stopping combustion control in only some of the cylinders while making the air-fuel ratios in the other cylinders lower than a stoichiometric air-fuel ratio. However, this makes it difficult to perform air-fuel ratio feedback control. If the air-fuel ratio feedback control is stopped, when the flow volume of blow-by gas becomes high, excessive fuel may flow into the post-processing device, raising the temperature of an exhaust system extremely high.

Having been contrived in view of this problem, the disclosure provides a control device and a control method of an internal combustion engine in which excessive fuel is less likely to flow out to the exhaust system of the internal combustion engine.

A first aspect of the disclosure relates to a control device that is applied to an internal combustion engine having a plurality of cylinders and includes an electronic control unit. This electronic control unit is configured to execute the following processes: (i) a base injection amount calculation process of calculating a base value of an injection amount injected by a fuel injection valve that supplies fuel to the cylinders; (ii) an injection valve operation process of operating the fuel injection valve so as to inject fuel in an amount according to the base value; (iii) a feedback process of correcting the injection amount in the injection valve operation process with respect to the base value to perform feedback control and bring an air-fuel ratio of an air-fuel mixture inside the cylinders of the internal combustion engine to a target value; and (iv) a determination process of determining whether or not an amount of fuel flowing into the cylinders other than fuel injected from the fuel injection valve is equal to or larger than a threshold value. The injection valve operation process includes a closed-loop process and an open-loop process. The closed-loop process is a process of injecting fuel in an injection amount of which the base value has been corrected by the feedback control. The open-loop process is a process of injecting fuel from the fuel injection valve with the feedback process stopped. The electronic control unit is configured not to execute the open-loop process when it is determined by the determination process that the amount of other fuel flowing into the cylinders other than fuel injected is equal to or larger than the threshold value.

The open-loop process is a process of injecting fuel from the fuel injection valve with the feedback process stopped. Therefore, during the open-loop process, it is difficult to reduce the amount of fuel injected from the fuel injection valve by the injection valve operation process, even when the amount of fuel that flows unintendedly into the cylinders separately from the fuel injected from the fuel injection valve becomes large. For this reason, the control device of the internal combustion engine of the first aspect does not execute the open-loop process when the amount of fuel flowing into the cylinders other than the fuel injected from the fuel injection valve is equal to or larger than the threshold value. Thus, excessive fuel is less likely to flow out to the exhaust system.

In the control device of the internal combustion engine of the first aspect, the determination process may include a process of determining that the amount of other fuel is equal to or larger than the threshold value when a correction ratio with respect to the base value in the feedback process is equal to or lower than a predetermined ratio.

When the amount of fuel flowing into the cylinders other than the fuel injected from the fuel injection valve is large, the absolute value of the correction ratio of the base value in the feedback process becomes large as a value on an amount reducing side. That is, when the correction ratio on the amount reducing side is negative, the correction ratio becomes low when the amount of fuel flowing into the cylinders other than the fuel injected from the fuel injection valve is large. Therefore, the control device of the internal combustion engine having the above configuration can determine with high accuracy whether or not the amount of fuel flowing into the cylinders other than the fuel injected from the fuel injection valve is equal to or larger than the threshold value based on whether or not the correction ratio is equal to or lower than the predetermined ratio.

In the control device of the internal combustion engine having the above configuration, the determination process may be a process of determining that the amount of other fuel is not equal to or larger than the threshold value when the correction ratio is equal to or lower than the predetermined ratio but the temperature of the internal combustion engine is equal to or lower than a specified temperature.

Typical situations where the amount of fuel flowing into the cylinders other than the fuel injected from the fuel injection valve becomes equal to or larger than the threshold value include a situation where the flow volume of blow-by gas becomes high. That is, one typical situation is where injected fuel that has not undergone combustion in a combustion cycle flows into the combustion chamber, for example, by turning into gas. Such a situation arises as the temperature of the internal combustion engine becomes high. If the temperature of the internal combustion engine is equal to or lower than the specified temperature, the control device of the internal combustion engine having the above configuration does not determine that the amount of other fuel is equal to or larger than the threshold value, even when the correction ratio is equal to or lower than the predetermined ratio. Thus, the control device is less likely to erroneously determine that the amount of fuel flowing into the cylinders other than the fuel injected from the fuel injection valve has become large, despite this not being the case, due to an abnormality of the feedback process or other causes.

In the control device of the internal combustion engine having the above configuration, the electronic control unit may be configured to execute a dilution amount estimation process of estimating an oil dilution amount using, as an input, a historical variable that is a variable showing a correlation with a history of fuel injection of the internal combustion engine.

The oil dilution amount may be an amount of fuel that is part of fuel injected from the fuel injection valve and that gets mixed into lubricating oil of the internal combustion engine without undergoing combustion in a combustion chamber of the internal combustion engine. The determination process may be a process of determining that the amount of other fuel is equal to or larger than the threshold value when the correction ratio is higher than the predetermined ratio but the oil dilution amount is equal to or larger than a dilution criterial value.

The oil dilution amount is determined by the history of fuel injection. The control device of the internal combustion engine having the above configuration estimates the oil dilution amount based on the historical variable. If the oil dilution amount is equal to or larger than the dilution criterial value, the control device of the internal combustion engine having the above configuration determines that the amount of other fuel is equal to or larger than the threshold value, even when the correction ratio is higher than the predetermined ratio. Thus, the likelihood that the open-loop process may be executed while the amount of fuel flowing into the cylinders other than the fuel injected from the fuel injection valve is large can be reduced more reliably.

In the control device of the internal combustion engine having the above configuration, the electronic control unit may be configured to execute an air-fuel ratio learning process. The closed-loop process may be a process of injecting fuel in an amount of which the base value has been corrected by a learned value in addition to a correction amount in the feedback process. The air-fuel ratio learning process may be a process of calculating the learned value such that the magnitude of a correction amount in the feedback process becomes small. The electronic control unit may be configured not to execute the air-fuel ratio learning process when the oil dilution amount is equal to or larger than a no-permission criterial value. The dilution criterial value may be smaller than the no-permission criterial value.

An amount-reducing correction ratio of the base value in the feedback process becomes high, for example, when the flow volume of blow-by gas is high. In other words, the correction ratio with respect to the base value becomes low when the correction ratio on the amount-reducing side is negative. In the case where the learned value is learned so as to reduce the amount-reducing correction ratio that is the magnitude of the correction ratio, the learned value is a value by which the base value is corrected so as to reduce the amount due to blow-by gas etc. As the blow-by gas or the like fluctuates depending on the operation environment of the internal combustion engine etc., deeply reflecting the influence thereof on the learned value diminishes the advantage of the learned value of being able to compensate for aged deterioration, individual differences, etc. of the fuel injection valve. The control device of the internal combustion engine having the above configuration does not execute the air-fuel ratio learning process when the oil dilution amount is equal to or larger than the no-permission criterial value. Further, the dilution criterial value is a value smaller than the no-permission criterial value. Compared with when it is not, the likelihood that unburned fuel may flow out excessively to the exhaust system during the open-loop process due to blow-by gas or the like can be reduced more reliably.

In the control device of the internal combustion engine of the first aspect, the internal combustion engine may include a canister, a purge passage, and an adjustment device. The canister may be configured to collect fuel vapor inside a fuel tank that stores fuel injected from the fuel injection valve. The purge passage may be a passage configured to connect the canister and an intake passage of the internal combustion engine to each other. The adjustment device may be a device configured to adjust the flow volume of fuel vapor flowing from the canister into the intake passage through the purge passage. The electronic control unit may be configured to, when executing the open-loop process, execute a purge stopping process of operating the adjustment device so as to adjust the flow volume of fuel vapor flowing from the canister into the intake passage through the purge passage to zero.

The control device of the internal combustion engine having this configuration executes the purge stopping process when executing the open-loop process. Thus, it is less likely that the controllability of the air-fuel ratio may decrease during execution of the open-loop process due to the influence of fuel vapor from the purge passage.

In the control device of the internal combustion engine of the first aspect, the open-loop process may include a process of stopping fuel supply from the fuel injection valve to some of the cylinders while continuing fuel supply from the fuel injection valve to the other cylinders.

The control device of the internal combustion engine having this configuration stops fuel supply to some of the cylinders, which makes it difficult to execute the feedback process compared with when fuel supply is not stopped. However, as the feedback process is stopped, excessive fuel is less likely to flow out to the exhaust system.

In the control device of the internal combustion engine having the above configuration, the internal combustion engine may include a post-processing device in an exhaust passage. The open-loop process may be a temperature raising process of raising the temperature of the post-processing device and may include a rich combustion process. The rich combustion process may be a process of making an air-fuel ratio of an air-fuel mixture inside the other cylinders lower than a stoichiometric air-fuel ratio.

The control device of the internal combustion engine having this configuration can raise the temperature of the post-processing device through an oxidation reaction between oxygen that flows out from some of the cylinders to the exhaust passage and unburned fuel that flows out from the other cylinders to the exhaust passage. However, when the unburned fuel increases unexpectedly due to blow-by gas or the like during the temperature raising process, the heat of the oxidation reaction may become excessive and raise the temperature of the post-processing device extremely high. Therefore, not executing the open-loop process when the amount of other fuel is determined to be equal to or larger than the threshold value by the determination process has a particularly great advantage.

A second aspect of the disclosure relates to a control method applied to an internal combustion engine that has a plurality of cylinders and includes a fuel injection valve that supplies fuel to the cylinders. This control method includes: (i) calculating a base value of an injection amount injected by the fuel injection valve that supplies fuel to the cylinders;

(ii) operating the fuel injection valve so as to inject fuel in an amount according to the base value; (iii) giving feedback for correcting an injection amount resulting from operation of the injection valve with respect to the base value to perform feedback control and bring an air-fuel ratio of an air-fuel mixture inside the cylinders of the internal combustion engine to a target value; (iv) determining whether or not an amount of fuel flowing into the cylinders other than fuel injected from the fuel injection valve is equal to or larger than a threshold value; and (v) not injecting fuel from the fuel injection valve with the feedback process stopped, when it is determined as a result of the determination that the amount of other fuel flowing into the cylinders other than fuel injected from the fuel injection valve is equal to or larger than the threshold value.

In the control method of the internal combustion engine of the second aspect of the disclosure, fuel is not injected from the fuel injection valve with the feedback process stopped, when it is determined that the amount of fuel flowing into the cylinders other than the fuel injected from the fuel injection valve is equal to or larger than the threshold value. Thus, excessive fuel is less likely to flow out to the exhaust system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
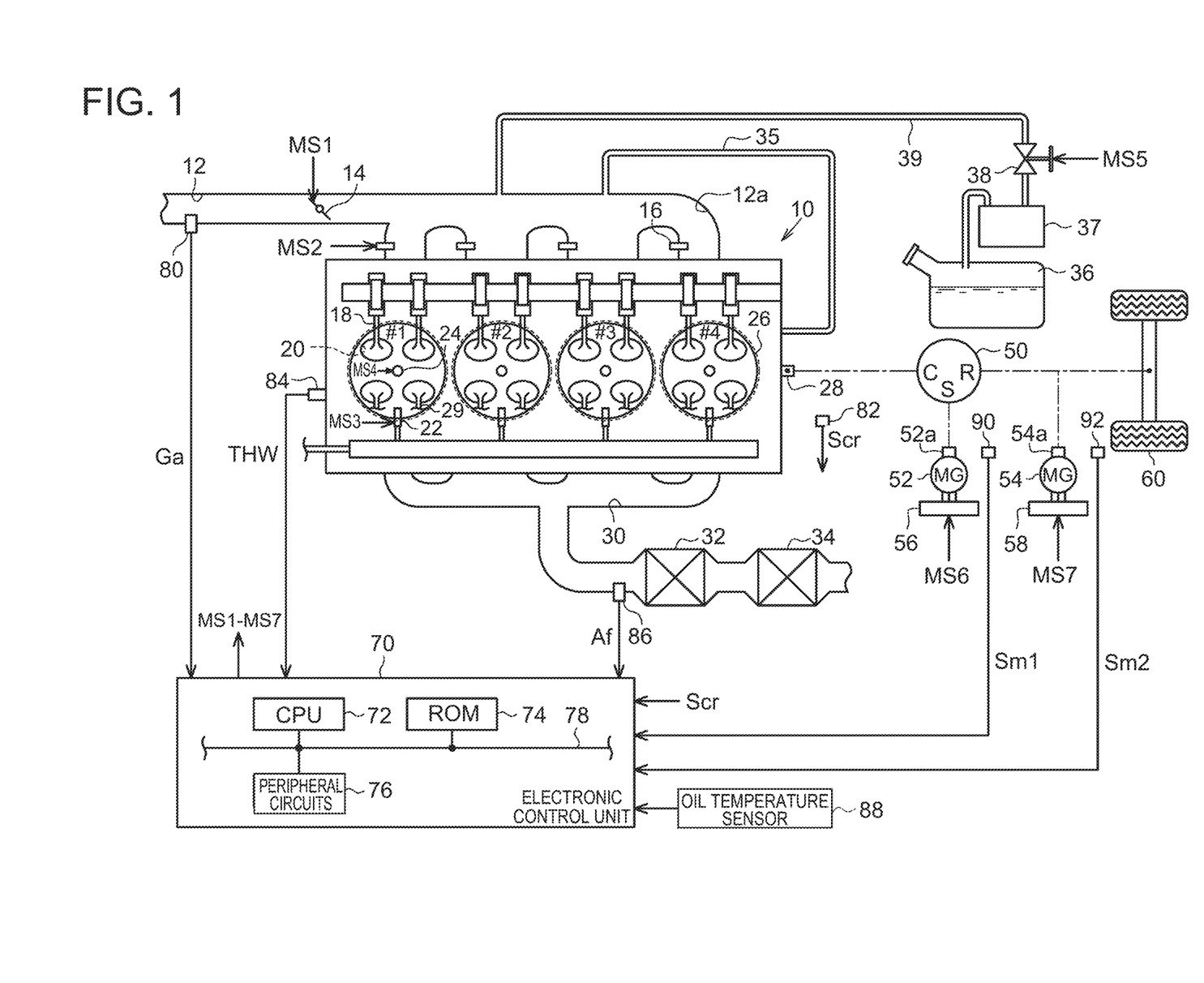
FIG. 1 is a diagram showing a control device of an internal combustion engine according to one embodiment of the disclosure, and a drive system of a vehicle.

One embodiment will be described below with reference to the drawings. As shown in FIG. 1, an internal combustion engine 10 includes four cylinders #1 to #14. A throttle valve 14 is provided in an intake passage 12 of the internal combustion engine 10. At an intake port 12a that is a downstream portion of the intake passage 12, port injection valves 16 that inject fuel into the intake port 12a are provided. Air taken into the intake passage 12 and the fuel injected from the port injection valves 16 flow into combustion chambers 20 as intake valves 18 open. Fuel is injected into the combustion chambers 20 from cylinder injection valves 22. An air-fuel mixture of the air and the fuel inside each combustion chamber 20 undergoes combustion as a spark plug 24 causes spark discharge. The resulting combustion energy is converted into rotary energy of a crankshaft 28 through a piston 26.

The air-fuel mixture having undergone combustion in each combustion chamber 20 is discharged to an exhaust passage 30 as exhaust gas as an exhaust valve 29 opens. In the exhaust passage 30, a three-way catalyst 32 having an oxygen storage capacity and a gasoline particulate filter (GPF) 34 are provided. This embodiment assumes as the GPF 34 a filter for collecting particulate matter (PM) on which a three-way catalyst having an oxygen storage capacity is supported.

Part of the fuel inside each combustion chamber 20 that adheres to a cylinder wall surface without undergoing combustion and then is scraped down into a crankcase by the piston 26 is returned to the intake passage 12 through a blow-by gas passage 35.

A fuel tank 36 stores fuel to be supplied to the port injection valves 16 and the cylinder injection valves 22. Part of the fuel stored inside the fuel tank 36 is vaporized into fuel vapor. This fuel vapor is collected by a canister 37. The fuel vapor collected by the canister 37 is returned to the intake passage 12 through a purge passage 39. To adjust the flow passage cross-sectional area of the purge passage 39, a purge valve 38 of which the opening degree can be electronically manipulated is provided in the purge passage 39.

The crankshaft 28 is mechanically coupled to a carrier C of a planetary gear mechanism 50 constituting a power split device. A rotating shaft 52a of a first motor-generator 52 is mechanically coupled to a sun gear S of the planetary gear mechanism 50. A rotating shaft 54a of a second motor-generator 54 and drive wheels 60 are mechanically coupled to a ring gear R of the planetary gear mechanism 50. An alternating-current voltage is applied to a terminal of the first motor-generator 52 by an inverter 56. An alternating-current voltage is applied to a terminal of the second motor-generator 54 by an inverter 58.

An electronic control unit 70 has the internal combustion engine 10 as a control target, and operates operating parts of the internal combustion engine 10, including the throttle valve 14, the port injection valves 16, the cylinder injection valves 22, the spark plugs 24, and the purge valve 38, to control torque, the component ratio of exhaust gas, etc. as control amounts of the internal combustion engine 10. Further, the electronic control unit 70 has the first motor-generator 52 as a control target, and operates the inverter 56 to control a rotation speed that is a control amount of the first motor-generator 52. The electronic control unit 70 has also the second motor-generator 54 as a control target, and operates the inverter 58 to control torque that is a control amount of the second motor-generator 54. In FIG. 1, operation signals MS1 to MS7 for the throttle valve 14, the port injection valves 16, the cylinder injection valves 22, the spark plugs 24, the purge valve 38, and the inverters 56, 58, respectively, are indicated. To control the control amounts of the internal combustion engine 10, the electronic control unit 70 refers to an intake air amount Ga detected by an air flowmeter 80 and an output signal Scr of a crank angle sensor 82. The electronic control unit 70 refers to a coolant temperature THW detected by a coolant temperature sensor 84, and an air-fuel ratio Af detected by an air-fuel ratio sensor 86 provided upstream of the three-way catalyst 32. The electronic control unit 70 refers to an oil temperature Toil that is the temperature of lubricating oil of the internal combustion engine 10 detected by an oil temperature sensor 88. To control the control amount of the first motor-generator 52, the electronic control unit 70 refers to an output signal Sm1 of a first rotation angle sensor 90 that detects the rotation angle of the first motor-generator 52. To control the control amount of the second motor-generator 54, the electronic control unit 70 refers to an output signal Sm2 of a second rotation angle sensor 92 that detects the rotation angle of the second motor-generator 54.

The electronic control unit 70 includes a CPU 72, a ROM 74, and peripheral circuits 76, and these devices can communicate with one another by a communication line 78. Here, the peripheral circuits 76 include a circuit that generates clock signals for specifying the internal operation, a power source circuit, and a reset circuit. The electronic control unit 70 controls the control amounts as the CPU 72 executes programs stored in the ROM 74.

In accordance with the programs stored in the ROM 74, the CPU 72 particularly executes processes that form the basis of fuel injection, a process of estimating a dilution amount of lubricating oil, and a regeneration process of the GPF 34. In the following, these processes will be sequentially described.

Processes that Form the Basis of Fuel Injection

Figure 2:
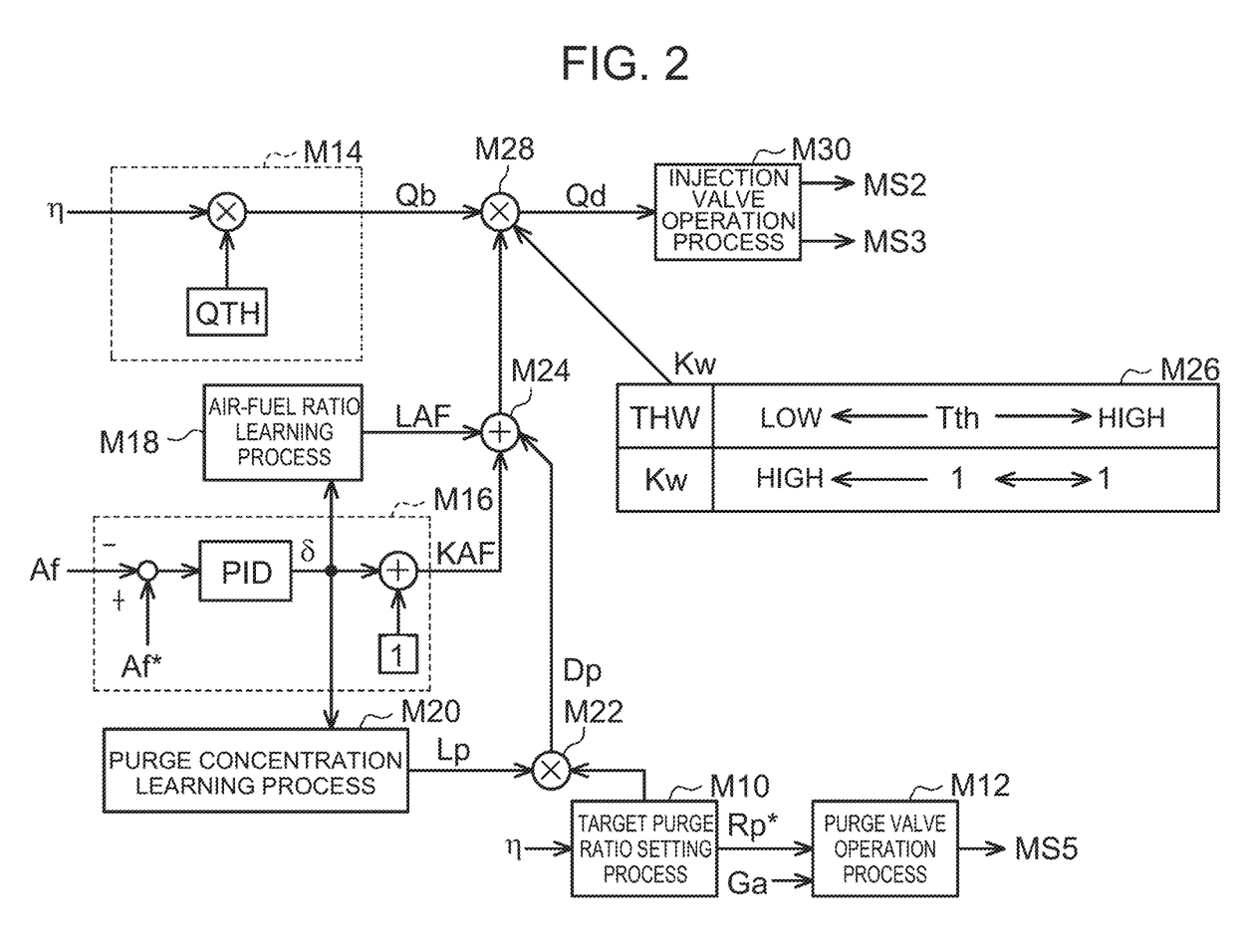
FIG. 2 is a block diagram showing processes executed by the control device according to the embodiment.

FIG. 2 shows the processes that form the basis of fuel injection. A target purge ratio setting process M10 is a process of calculating a target purge ratio Rp* based on a charging efficiency η. Here, the purge ratio is a value obtained by dividing the flow volume of a fluid flowing from the canister 37 into the intake passage 12 by the intake air amount Ga, and the target purge ratio Rp* is a target value of the purge ratio for control use.

A purge valve operation process M12 is a process of, based on the intake air amount Ga, outputting the operation signal MS5 to the purge valve 38 to operate the purge valve 38 such that the purge ratio meets the target purge ratio Rp*. Here, the purge valve operation process M12 is a process in which, if the target purge ratio Rp* is the same, the opening degree of the purge valve 38 is set to a smaller value when the intake air amount Ga is smaller. This is because, even when the pressure inside the canister 37 is the same, the pressure inside the intake passage 12 is lower when the intake air amount Ga is smaller. That is, in this case, the pressure inside the canister 37 is higher than the pressure inside the intake passage 12, so that a fluid flows more easily from the canister 37 to the intake passage 12.

A base injection amount calculation process M14 is a process of calculating, based on the charging efficiency η, a base injection amount Qb that is a base value of a fuel amount for bringing the air-fuel ratio of the air-fuel mixture inside the combustion chamber 20 to the target air-fuel ratio. Specifically, the base injection amount calculation process M14 can be a process in which the base injection amount Qb is calculated by multiplying, by the charging efficiency ij, a fuel amount QTH corresponding to 1% of the charging efficiency η for bringing the air-fuel ratio to the target air-fuel ratio. The base injection amount Qb is a fuel amount calculated to control the air-fuel ratio so as to meet the target air-fuel ratio based on the amount of air charged into the combustion chamber 20. The target air-fuel ratio can be, for example, a stoichiometric air-fuel ratio.

A correction factor calculation process M16 is a process of calculating a feedback correction factor KAF that is a correction factor of the base injection amount Qb. The feedback correction factor KAF is a value obtained by adding "one" to a correction ratio δ that is an operation amount for performing feedback control and bringing the air-fuel ratio Af that is a feedback control amount to a target value Aft. Here, when the correction ratio δ is "zero," the correction ratio of the base injection amount Qb is zero. When the correction ratio δ is higher than "zero," the base injection amount Qb is corrected so as to increase the amount, and when the correction ratio d is lower than "zero," the base injection amount Qb is corrected so as to reduce the amount. In this embodiment, the correction ratio δ is obtained by summing up a sum of respective output values of a proportional element and a differential element into which the difference between the target value Af* and the air-fuel ratio Af is input, and an output value of an integral element that outputs an integrated value of a value according to that difference.

An air-fuel ratio learning process M18 is a process of updating an air-fuel ratio learned value LAF as needed during an air-fuel ratio learning period such that the difference between the correction ratio δ and "zero" becomes small. The air-fuel ratio learning process M18 includes a process of determining that the air-fuel ratio learned value LAF has converged when the amount of deviation of the correction ratio δ from "zero" has become equal to or smaller than a predetermined value.

A purge concentration learning process M20 is a process of calculating a purge concentration learned value Lp based on the correction ratio δ. The purge concentration learned value Lp is a value obtained by converting a correction ratio for correcting the deviation, due to fuel vapor flowing from the canister 37 into the combustion chamber 20, of the base injection amount Qb from an injection amount required for controlling the air-fuel ratio to the target air-fuel ratio into a value corresponding to 1% of the purge ratio. Here, this embodiment assumes that deviation of the feedback correction factor KAF from "one" while the target purge ratio Rp* is controlled to a value larger than "zero" is entirely attributable to fuel vapor having flowed from the canister 37 into the combustion chamber 20. That is, this embodiment assumes the correction ratio δ to be a correction ratio for correcting the deviation, due to fuel vapor flowing from the canister 37 into the intake passage 12, of the base injection amount Qb from the injection amount required for controlling the air-fuel ratio to the target air-fuel ratio. However, since the correction ratio δ depends on the purge ratio, in this embodiment, the purge concentration learned value Lp is an amount according to "δ/Rp" that is a value corresponding to 1% of the purge ratio. Specifically, the purge concentration learned value Lp is a value obtained by performing an exponential moving average process on the value corresponding to 1% of the purge ratio "δ/Rp." It is desirable that the target purge ratio Rp* be set to a value larger than zero and the purge concentration learning process M20 be executed, on the condition that the air-fuel ratio learned value LAF is determined to have converged.

A purge correction ratio calculation process M22 is a process of calculating a purge correction ratio Dp by multiplying the target purge ratio Rp* by the purge concentration learned value Lp. The purge correction ratio Dp is a value equal to or smaller than zero.

An addition process M24 is a process of adding the air-fuel ratio learned value LAF and the purge correction ratio Dp to the feedback correction factor KAF.

A low-temperature amount increasing process M26 is a process in which, when the coolant temperature THW is lower than a low-temperature threshold value Tth, a low-temperature amount increasing factor Kw of the base injection amount Qb is calculated as a value larger than "one." Here, the low-temperature threshold value Tth can be, for example, 40° C. In the low-temperature amount increasing process M26, if the coolant temperature THW is lower than the low-temperature threshold value Tth, the low-temperature amount increasing factor Kw is set to a larger value when the coolant temperature THW is low than when the coolant temperature TI-W is high.

A required injection amount calculation process M28 is a process of multiplying the base injection amount Qb by the output value of the addition process M24 and the low-temperature amount increasing factor Kw.

An injection valve operation process M30 is a process of outputting the operation signal MS2 to the port injection valve 16 to operate the port injection valve 16 and outputting the operation signal MS3 to the cylinder injection valve 22 to operate the cylinder injection valve 22. In particular, the injection valve operation process M30 is a process of setting the amount of fuel injected from the port injection valve 16 and the cylinder injection valve 22 during one combustion cycle to an amount according to a required injection amount Qd.

Next, the process of estimating the dilution amount of the lubricating oil will be described. For example, when the temperature of the internal combustion engine 10 is low, part of the fuel supplied into the combustion chamber 20 may fail to undergo combustion in a state of adhering to the cylinder wall surface during a combustion stroke. Then, this fuel adhering to the cylinder wall surface is scraped down into the crankcase by the piston 26. Thus, the fuel gets mixed into the lubricating oil of the internal combustion engine 10. In other words, the lubricating oil is diluted by the fuel getting mixed in. The CPU 72 calculates an oil dilution amount DIL as a variable showing a positive correlation with the amount of fuel in the lubricating oil.

Figure 3:
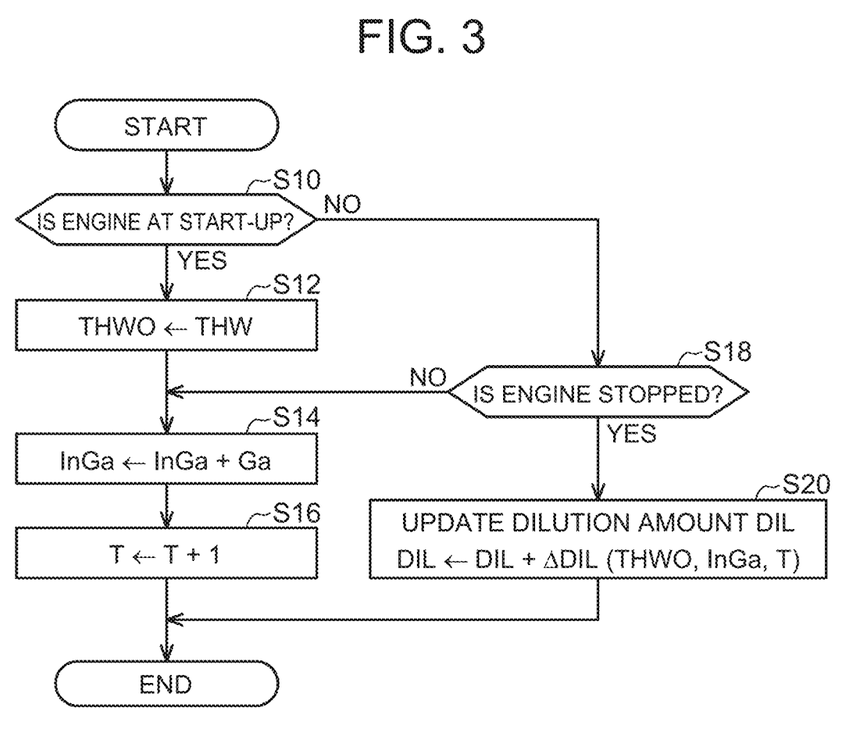
FIG. 3 is a flowchart showing the procedure of a process executed by the control device according to the embodiment.

FIG. 3 shows the procedure of a process for calculating the oil dilution amount DIL. The process shown in FIG. 3 is realized as the CPU 72 executes a program stored in the ROM 74 repeatedly, for example, on predetermined cycles. In the following, step numbers of the respective processes will be expressed by numbers following the initial letter "S."

In the series of processes shown in FIG. 3, the CPU 72 first determines whether or not the internal combustion engine 10 is at start-up (S10). When the CPU 72 determines that the internal combustion engine 10 is at start-up (S10: YES), the CPU 72 substitutes the coolant temperature THW that has been detected by the current time into a start-up coolant temperature THW0 (S12). Next, the CPJ 72 substitutes a value obtained by adding the intake air amount Ga to an integrated air amount InGa into the integrated air amount InGa (S14). The integrated air amount InGa is an integrated value of the intake air amount Ga from the start-up of the internal combustion engine 10. Then, the CPU 72 updates a running time T from the start-up (S16).

On the other hand, when the CPU 72 determines that the internal combustion engine 10 is not at start-up (S10: NO), the CPU 72 determines whether or not the internal combustion engine 10 is stopped (S18). When the CPU 72 determines that the internal combustion engine 10 is not stopped (S18: NO), the CPU 72 moves to the process of S14. On the other hand, when the CPU 72 determines that the internal combustion engine 10 is stopped (S18: YES), the CPU 72 updates the oil dilution amount DIL (S20). Here, the CPU 72 sets an update amount ΔDIL of the oil dilution amount DIL so as to vary according to the start-up coolant temperature TI-IWO, the integrated air amount InGa, and the running time T.

The CPU 72 sets the update amount ΔDIL to a larger value when the start-up coolant temperature THW0 is low than when it is high. This setting takes into account that when the start-up coolant temperature THW0 is lower, the low-temperature amount increasing factor Kw is larger and therefore a larger amount of fuel is scraped down into the crankcase by the piston 26. The CPU 72 calculates the update amount ΔDIL as a smaller value when the running time T is long than when the running time T is short. Further, the CPU 72 calculates the update amount ΔDIL as a larger value when the integrated air amount InGa is large than when the integrated air amount InGa is small. Then, the CPU 72 updates the oil dilution amount DIL by the update amount ΔDIL.

When the CPU 72 has completed the processes of S16 and S20, the CPU 72 temporarily ends the series of processes shown in FIG. 3.

Figure 4:
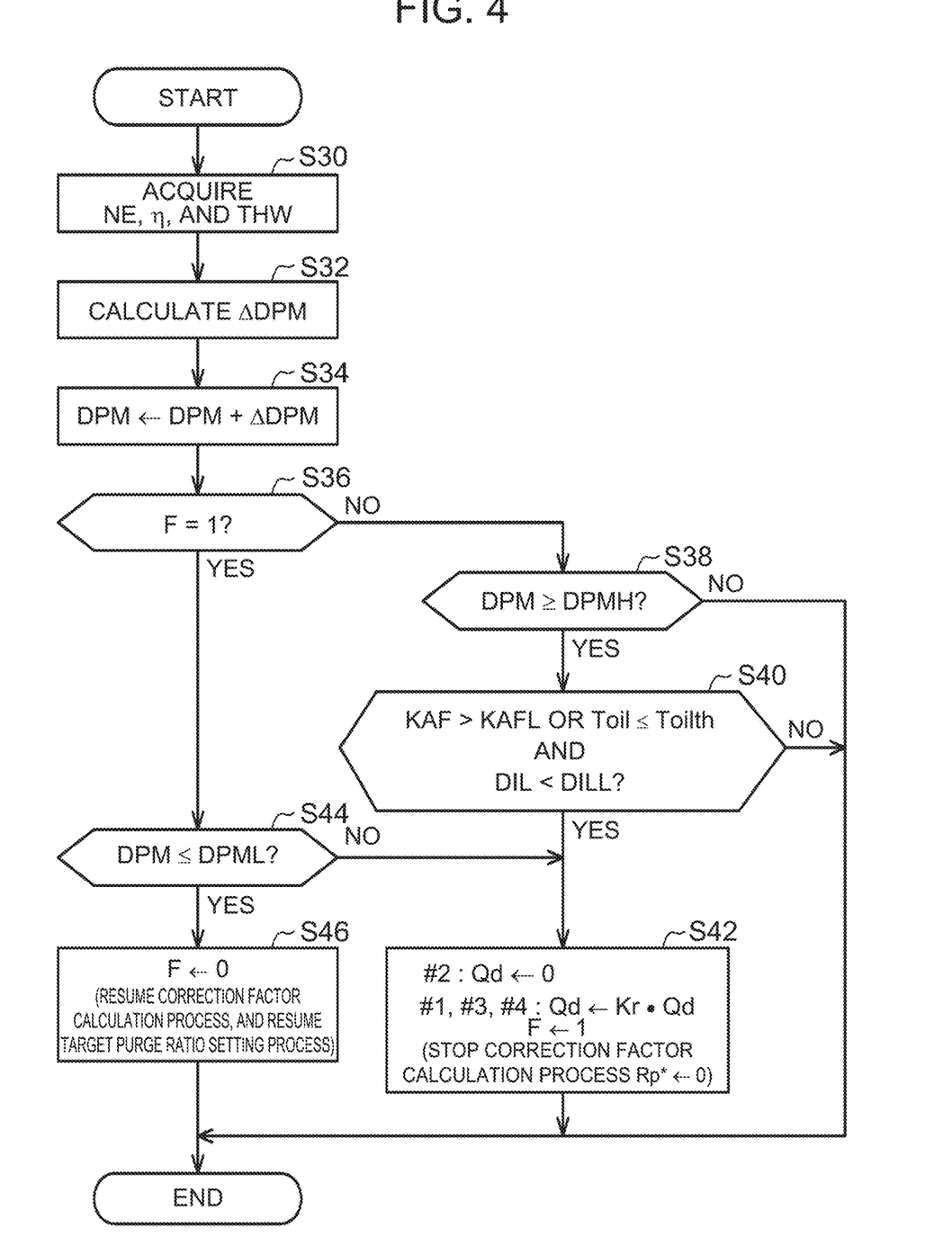
FIG. 4 is a flowchart showing the procedure of a process executed by the control device according to the embodiment.

Next, the regeneration process of the GPF 34 will be described. FIG. 4 shows the procedure of a process for regenerating the GPF 34. The series of processes shown in FIG. 4 is realized as the CPU 72 executes a program stored in the ROM 74 repeatedly, for example, on predetermined cycles.

In the series of processes shown in FIG. 4, the CPU 72 first acquires a rotation speed NE, the charging efficiency η, and the coolant temperature THW (S30). Next, the CPU 72 calculates an update amount ΔDPM of a deposition amount DPM based on the rotation speed NE, the charging efficiency η, and the coolant temperature THW (S32). Here, the deposition amount DPM is an amount of PM collected by the GPF 34. Specifically, the CPU 72 calculates an amount of PM in exhaust gas discharged to the exhaust passage 30 based on the rotation speed NE, the charging efficiency q, and the coolant temperature THW The CPU 72 calculates the temperature of the GPF 34 based on the rotation speed NE and the charging efficiency η. The CPU 72 calculates the update amount ΔDPM based on the amount of PM in the exhaust gas and the temperature of the GPF 34. During execution of the process of S42 to be described later, the temperature of the GPF 34 and the update amount ΔDPM may be calculated based on a temperature-rising amount increasing factor Kr.

Next, the CPU 72 updates the deposition amount DPM according to the update amount ΔDPM (S34). Next, the CPU 72 determines whether or not an execution flag F is "one" (S36). When the execution flag F is "1," it shows that a temperature raising process for burning and thereby removing the PM on the GPF 34 is executed, and when the execution flag F is "zero," it shows that this process is not executed. When the CPU 72 determines that the execution flag F is "zero" (S36: NO), the CPU 72 determines whether or not the deposition amount DPM is equal to or larger than a regeneration execution value DPMH (S38). The regeneration execution value DPMH is set to a value at which the amount of PM collected by the GPF 34 has become so large that it is desirable to remove the PM.

When the CPU 72 determines that the deposition amount DPM is equal to or larger than the regeneration execution value DPMH (S38: YES), the CPU 72 determines whether or not a condition that a logical product of the following Condition A and Condition B is true that is a condition for executing the temperature raising process is met (S40).

Condition A is a condition that a logical sum of the feedback correction factor KAF being larger than a lower limit value KAFL and the oil temperature Toil being equal to or lower than a specified temperature Toilth is true. This condition is a condition for determining whether or not the amount of fuel flowing into the combustion chamber 20 through the blow-by gas passage 35 is large. That is, as this amount of fuel becomes larger, the feedback correction factor KAF becomes further smaller than "one." However, a situation where a large amount of fuel flows from the blow-by gas passage 35 arises when the oil temperature Toil is equal to or higher than a certain temperature. This is because when the oil temperature Toil is extremely low, fuel in the lubricating oil hardly vaporizes. Therefore, if the oil temperature Toil is equal to or lower than the specified temperature Toilth when the feedback correction factor KAF is equal to or smaller than the lower limit value KAFL, it is probable that the feedback correction factor KAF is equal to or lower than the lower limit value KAFL due to other factors than vaporization of fuel in the lubricating oil.

Condition B is a condition that the oil dilution amount DIL is smaller than a dilution criterial value DILL. Here, the dilution criterial value DILL is set to an upper limit value of the oil dilution amount DIL at which the feedback correction factor KAF does not become extremely small.

When the CPU 72 determines that the logical product is true (S40: YES), the CPU 72 executes the temperature raising process and substitutes "one" into the execution flag F (S42). As the temperature raising process according to this embodiment, the CPU 72 stops fuel injection from the port injection valve 16 and the cylinder injection valve 22 of the cylinder #2, and makes the air-fuel ratios of the air-fuel mixtures inside the combustion chambers 20 of the cylinders #1, #3, #4 lower than the stoichiometric air-fuel ratio. This process is firstly a process for raising the temperature of the three-way catalyst 32. That is, oxygen and unburned fuel are discharged to the exhaust passage 30 to oxidize the unburned fuel in the three-way catalyst 32 and thereby raise the temperature of the three-way catalyst 32. Secondly, this process is a process for raising the temperature of the GPF 34 and supplying oxygen to the GPF 34 that has reached a high temperature to remove the PM collected by the GPF 34 through oxidation. That is, when the temperature of the three-way catalyst 32 becomes high, the temperature of the GPF 34 rises as high-temperature exhaust gas flows into the GPF 34. As the oxygen flows into the GPF 34 having reached a high temperature, the PM collected by the GPF 34 is removed through oxidation.

Specifically, the CPU 72 substitutes "zero" into the required injection amount Qd corresponding to the port injection valve 16 and the cylinder injection valve 22 of the cylinder #2. Meanwhile, the CPU 72 substitutes a value obtained by multiplying the required injection amount Qd by the temperature-raising amount increasing factor Kr into the required injection amounts Qd for the cylinders #1, #3, #4.

The CPU 72 sets the temperature-raising amount increasing factor Kr such that the unburned fuel in the exhaust gas discharged from the cylinders #1, #3, #4 to the exhaust passage 30 becomes equal to or smaller than an amount in which the unburned fuel reacts with the oxygen discharged from the cylinder #2 neither excessively nor insufficiently. Specifically, at an initial stage of the regeneration process of the GPF 34, the CPU 72 sets the air-fuel ratios of the air-fuel mixtures inside the cylinders #1, #3, #4 to a value as close as possible to that amount in which the reaction occurs neither excessively nor insufficiently to thereby quickly raise the temperature of the three-way catalyst 32.

When executing the temperature raising process, the CPU 72 stops the correction factor calculation process M16. The CPU 72 substitutes zero into the target purge ratio Rp*. Thus, the opening degree of the purge valve 38 is adjusted to zero.

On the other hand, when the CPU 72 determines that the execution flag F is "one" (S36: YES), the CPU 72 determines whether or not the deposition amount DPM is equal to or smaller than a stopping threshold value DPML (S44). The stopping threshold value DPML is set to a value at which the amount of PM collected by the GPF 34 has become small enough that the regeneration process can be stopped. When the CPU 72 determines that the deposition amount DPM is larger than the stopping threshold value DPML (844: NO), the CPU 72 moves to the process of S42.

On the other hand, when the deposition amount DPM is equal to or smaller than the stopping threshold value DP ML (S44: YES), the CPU 72 stops the process of S42 and substitutes "zero" into the execution flag F (S46). The CPU 72 resumes the correction factor calculation process M16. Further, the CPU 72 resumes setting of the target purge ratio Rp* by the target purge ratio setting process M10.

When the CPU 72 has completed the processes of S42 and S46 and when the CPU 72 has determined in the negative in the processes of S38 and S40, the CPU 72 temporarily ends the series of processes shower in FIG. 4. Here, the workings and effects of this embodiment will be described.

Figure 5:
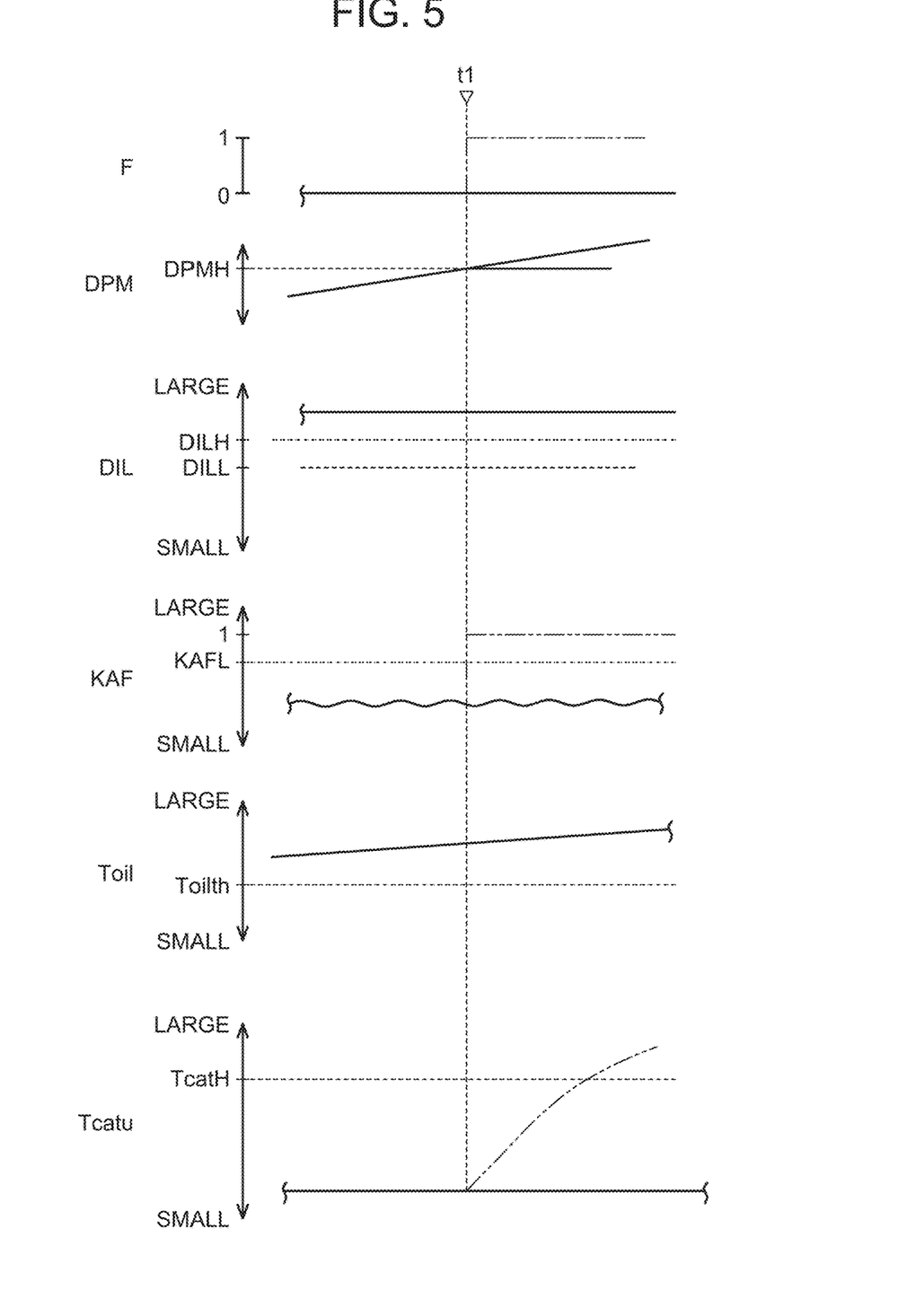
FIG. 5 is a time chart showing the workings of the embodiment.

As shown in FIG. 5, when the deposition amount DPM reaches the regeneration execution value DPMH at time t1, the GPF 34 needs to be regenerated. In the case shown in FIG. 5, however, the oil dilution amount DIL at time t1 is larger than the dilution criterial value DILL, and moreover, the feedback correction factor KAF is smaller than the lower limit value KAFL and the oil temperature Toil is higher than the specified temperature Toilth. This is a situation where the amount-reducing correction ratio of the base injection amount Qb in the air-fuel ratio feedback control has become high due to a large amount of fuel flowing from the blow-by gas passage 35 into the intake passage 12. In other words, this is a situation where the magnitude of the correction ratio with respect to the base injection amount Qb has become large. This means that if the air-fuel ratio feedback control is stopped, fuel controllability decreases. For this reason, the CPU 72 continues the air-fuel ratio feedback control without executing the regeneration process of the GPF 34.

On the other hand, if the regeneration process of the GPF 34 is executed, excessive fuel may be supplied to the three-way catalyst 32. In this case, as indicated by the alternate long and double-short dashed line in FIG. 5, a temperature Tcatu of the three-way catalyst 32 may rise extremely and exceed an allowable upper limit temperature TeatH.

A no-permission criterial value DILH shown in FIG. 5 is a criterial value for not permitting execution of the air-fuel ratio learning process MI. In this embodiment, the dilution criterial value DILL is a value smaller than the no-permission criterial value DILH. Thus, compared with when the dilution criterial value DILL is equal to or larger than the no-permission criterial value DILH, the likelihood that excessive fuel may flow into the GPF 34 during execution of the regeneration process of the GPF 34 can be reduced more reliably.

The embodiment having been described above can further produce the workings and effects described below.

(1) When the oil temperature Toil is equal to or lower than the specified temperature Toilth, the regeneration process of the GPF 34 is permitted even when the feedback correction factor KAF is equal to or smaller than the lower limit value KAFL. A situation such as where the flow volume of blow-by gas becomes high arises as the oil temperature Toil becomes high Therefore, this embodiment can reduce the likelihood that the regeneration process of the GPF 34 may be prohibited based on an erroneous determination that the flow volume of blow-by gas has become high, despite this not being the case, due to an abnormality of the feedback process or other causes.

(2) If the oil dilution amount DIL is equal to or larger than the dilution criterial value DILL, the regeneration process of the GPF 34 is prohibited even when the feedback correction factor KAF is larger than the lower limit value KAFL. Thus, the likelihood that the regeneration process of the GPF 34 may be executed despite the flow volume of blow-by gas having become high can be reduced more reliably.

(3) The purge valve 38 is closed during the regeneration process of the GPF 34. Thus, it is less likely that excessive fuel may flow into the three-way catalyst 32 due to fuel vapor from the purge passage 39 during the regeneration process of the GPF 34.

(4) The purge correction ratio Dp is set as a feedforward correction amount for correcting the base injection amount according to fuel vapor returned from the purge passage 39 to the intake passage 12. Thus, in the process of S40, whether or not the situation is such that the controllability of the air-fuel ratio is reduced by the fuel flowing in from the blow-by gas passage 35 can be determined with higher accuracy.

The correspondence relationships between the items in the above embodiment of the disclosure and the items described in the "summary" section are as follows: The base injection amount calculation process M14 is one example of the "base injection amount calculation process." The injection valve operation process M30 is one example of the "injection valve operation process." The correction factor calculation process M16 and the required injection amount calculation process M28 are examples of the "feedback process." The process of S40 is one example of the "determination process." The process of S42 is one example of the "open-loop process." The process resumed by the process of S46 is one example of the "closed-loop process." KAF-1 is one example of the "correction ratio." KAFL-1 is one example of the "predetermined ratio." The running time T and the integrated air amount InGa are examples of the "historical variable," The process of FIG. 3 is one example of the "dilution amount estimation process." The dilution criterial value DILL is one example of the "dilution criterial value." The air-fuel ratio learning process MIS is one example of the "air-fuel ratio learning process." The no-permission criterial value DILH is one example of the "no-permission criterial value." The purge valve 38 is one example of the "adjustment device." Substitution of zero into the target purge ratio Rp* in the process of S42 is one example of the "purge stopping process."

Next, other embodiments will be described. The embodiment can be implemented with changes made thereto as follows. The embodiment and the following modified examples can be implemented in combinations to such an extent that no technical inconsistency arises.

Modified examples of the "dilution amount estimation process" will be described below.

In the above embodiment, the oil dilution amount DIL is updated while the internal combustion engine 10 is stopped, but the disclosure is not limited thereto. For example, the oil dilution amount DIL may be updated on predetermined time cycles.

The update amount ΔDIL of the oil dilution amount is not limited to that calculated using the start-up coolant temperature THW0, the running time T, and the integrated air amount InGa as an input. For example, the process may use an integrated value of the base injection amount Qb and an integrated amount of the required injection amount Qd as an input.

Next, modified examples of the "determination process" will be described. For example, in Condition A, the coolant temperature TIW may be used instead of the oil temperature Toil. Further, the logical sum is not limited to that of the correction ratio KAF-1 being higher than the predetermined ratio KAFL-1 and the temperature of the internal combustion engine 10 being higher than the specified temperature. Condition A may be simply a condition that the correction ratio KAF-1 is higher than the predetermined ratio KAFL-1.

It is not essential that the dilution criterial value DILL is smaller than the no-permission criterial value DILH.

The condition for determining that the amount of fuel flowing into the combustion chamber 20 other than the fuel injected from the port injection valve 16 and the cylinder injection valve 22 is smaller than the threshold value is not limited to the condition that the logical product of the above-described Condition A and Condition B is true.

The process for determining whether or not the amount of fuel flowing into the cylinder other than the fuel injected from the fuel injection valve is equal to or larger than the threshold value is not limited to the process of determining whether or not the flow volume of blow-by gas is high. For example, the process may be a process of determining an amount of fuel that adheres to an intake system including the intake passage 12 and the intake valve 18 and that vaporizes and flows out to the exhaust passage 30. Also in this case, the above-described Condition A can be used. Further, if correction using the purge correction ratio Dp is not performed, for example, the amount of fuel flowing into the cylinder other than the fuel injected from the fuel injection valve may include an amount of fuel flowing from the purge passage 39 into the intake passage 12.

Next, modified examples of the "open-loop process" will be described.

In the process of S42, combustion control is stopped for one cylinder in one combustion cycle, but the disclosure is not limited thereto. For example, combustion control may be stopped for two cylinders.

In the above embodiment, the cylinder for which combustion control is stopped in each combustion cycle is fixed as a predetermined cylinder, but the disclosure is not limited thereto. For example, the cylinder for which combustion control is stopped may be changed on predetermined cycles.

The open-loop process is not limited to the regeneration process of the post-processing device. For example, the open-loop process may be a process of stopping fuel supply in some of the cylinders to adjust the output of the internal combustion engine 10. For example, the open-loop process may be a process of, when an abnormality occurs in some cylinders, stopping fuel supply in these cylinders. Further, for example, the open-loop process may be a process of, when the amount of oxygen stored in the three-way catalyst 32 becomes equal to or smaller than a specified value, executing control so as to stop fuel supply in only some of the cylinders and make the air-fuel ratios of the air-fuel mixtures in the other cylinders equal to the stoichiometric air-fuel ratio. In any case, if fuel supply in some of the cylinders is stopped, it becomes difficult to perform feedback control of the air-fuel ratio based on a detection value of a sensor that is provided at a merging part of exhaust gas from the cylinders in which fuel is supplied and exhaust gas from the cylinders in which fuel is not supplied. It is therefore necessary to stop the feedback process of the air-fuel ratio.

Next, a modified example of the "feedback process" will be described.

In the above embodiment, the correction ratio δ is obtained by summing up the sum of the output of the proportional element and the output of the differential element, and the output of the integral element, but the disclosure is not limited thereto. For example, the correction ratio δ may be obtained by summing up the output of the proportional element and the output of the integral element.

Next, a modified example of the "purge stopping process" will be described.

It is not essential to set the target purge ratio Rp* to zero during the regeneration process of the GPF 34. When setting the target purge ratio Rp* to be larger than zero during the regeneration process of the GPF 34, it is desirable that the base injection amount Qb be corrected by the purge correction ratio Dp. The purge correction ratio Dp here can be calculated using the purge concentration learned value Lp before the start of the regeneration process of the GPF 34.

Next, a modified example of the "estimation of the deposition amount" will be described.

The process of estimating the deposition amount DPM is not limited to that illustrated in FIG. 4. For example, the deposition amount DPM may be estimated based on the difference between pressures on an upstream side and a downstream side of the GPF 34 and on the intake air amount Ga. Specifically, the deposition amount DPM may be estimated to be a larger value when the pressure difference is large than when the pressure difference is small, and even when the pressure difference is the same, the deposition amount DPM may be estimated to be a larger value when the intake air amount Ga is small than when the intake air amount Ga is large.

Next, modified examples of the "post-processing device" will be described.

The GPF 34 is not limited to a filter on which a three-way catalyst is supported, and may instead be a filter alone. The GPF 34 is not limited to one provided downstream of the three-way catalyst 32 in the exhaust passage 30. That the post-processing device includes the GPF 34 itself is not essential. For example, also when the post-processing device is composed only of the three-way catalyst 32, the temperature of the post-processing device needs to be raised during the regeneration process, so that executing the processes illustrated in the above embodiment and its modified examples is effective.

Next, modified examples of the "control device" will be described.

The control device is not limited to one that includes the CPU 72 and the ROM 74 and executes software processes. For example, the control device may include a dedicated hardware circuit, such as an ASIC, that processes as hardware at least some of the processes that are processed by software in the above embodiment. That is, the control device may have one of the following configurations (a) to (c): (a) a configuration including a processing device that executes all of the above-described processes in accordance with programs, and a program storage device, such as a ROM, that stores these programs; (b) a configuration including a processing device that executes some of the above-described processes in accordance with programs, a program storage device, and a dedicated hardware circuit that executes the other processes; and (c) a configuration that includes a dedicated hardware circuit that executes all of the above-described processes. Here, more than one software execution device including a processing device and a program storage device, or more than one dedicated hardware circuit may be provided.

Next, a modified example of the "adjustment device" will be described.

In the above embodiment, the purge valve 38 is illustrated as the adjustment device that adjusts the amount of fuel vapor collected by the canister 37 and flowing into the intake passage 12, but the disclosure is not limited thereto. For example, the adjustment device may include a pump that suctions a fluid inside the canister 37 and discharges the fluid to the intake passage 12. This is particularly effective because, in the internal combustion engine 10 including a turbocharger, the pressure inside the intake passage 12 may not become low compared with the pressure on the side of the canister 37.

Next, modified examples of the "vehicle" will be described.

The vehicle is not limited to a series-parallel hybrid electric vehicle, but may instead be, for example, a parallel hybrid electric vehicle or a series hybrid electric vehicle. However, the vehicle is not limited to a hybrid electric vehicle, but may instead be, for example, a vehicle having only the internal combustion engine 10 as a device that generates power for the vehicle.

What is claimed is:

1. A control device of an internal combustion engine applied to the internal combustion engine including a plurality of cylinders, comprising an electronic control unit configured to execute the following processes:
   a base injection amount calculation process of calculating a base value of an injection amount injected by a fuel injection valve that supplies fuel to the cylinders;
   an injection valve operation process of operating the fuel injection valve so as to inject fuel in an amount according to the base value;
   a feedback process of correcting an injection amount in the injection valve operation process with respect to the base value to perform feedback control and bring an air-fuel ratio of an air-fuel mixture inside the cylinders of the internal combustion engine to a target value; and
   a determination process of determining whether or not an amount of other fuel flowing into the cylinders other than fuel injected from the fuel injection valve is equal to or larger than a threshold value,
   wherein the injection valve operation process includes a closed-loop process and an open-loop process, the closed-loop process being a process of injecting fuel in an injection amount of which the base value has been corrected by the feedback process, the open-loop process being a process of injecting fuel from the fuel injection valve with the feedback process stopped, and
   wherein the electronic control unit is configured not to execute the open-loop process when it is determined by the determination process that the amount of other fuel flowing into the cylinders other than fuel injected is equal to or larger than the threshold value.

2. The control device of the internal combustion engine according to claim 1, wherein the determination process includes a process of determining that the amount of other fuel is equal to or larger than the threshold value when a correction ratio with respect to the base value in the feedback process is equal to or lower than a predetermined ratio.

3. The control device of the internal combustion engine according to claim 2, wherein the determination process is a process of determining that the amount of other fuel is not equal to or larger than the threshold value when the correction ratio is equal to or lower than the predetermined ratio but a temperature of the internal combustion engine is equal to or lower than a specified temperature.

4. The control device of the internal combustion engine according to claim 2, wherein:
   the electronic control unit is configured to execute a dilution amount estimation process of estimating an oil dilution amount using, as an input, a historical variable that is a variable showing a correlation with a history of fuel injection of the internal combustion engine;

the oil dilution amount is an amount of fuel that is part of fuel injected from the fuel injection valve and that gets mixed into lubricating oil of the internal combustion engine without undergoing combustion in a combustion chamber of the internal combustion engine; and the determination process is a process of determining that the amount of other fuel is equal to or larger than the threshold value when the correction ratio is higher than the predetermined ratio but the oil dilution amount is equal to or larger than a dilution criterial value.

5. The control device of the internal combustion engine according to claim 4, wherein:

the electronic control unit is configured to execute an air-fuel ratio learning process;

the closed-loop process is a process of injecting fuel in an amount of which the base value has been corrected by a learned value in addition to a correction amount in the feedback process;

the air-fuel ratio learning process is a process of calculating the learned value such that a magnitude of a correction amount in the feedback process becomes small;

the electronic control unit is configured not to execute the air-fuel ratio learning process when the oil dilution amount is equal to or larger than a no-permission criterial value; and the dilution criterial value is smaller than the no-permnission criterial value.

6. The control device of the internal combustion engine according to claim 1, wherein:

the internal combustion engine includes a canister, a purge passage, and an adjustment device;

the canister is configured to collect fuel vapor inside a fuel tank that stores fuel injected from the fuel injection valve;

the purge passage is a passage configured to connect the canister and an intake passage of the internal combustion engine to each other;

the adjustment device is configured to adjust a flow volume of fuel vapor flowing from the canister into the intake passage through the purge passage; and the electronic control unit is configured to, when executing the open-loop process, execute a purge stopping process of operating the adjustment device so as to adjust a flow volume of fuel vapor flowing from the canister into the intake passage through the purge passage to zero.

7. The control device of the internal combustion engine according to claim 1, wherein the open-loop process includes a process of stopping fuel supply from the fuel injection valve to some of the cylinders while continuing fuel supply from the fuel injection valve to the other cylinders.

8. The control device of the internal combustion engine according to claim 7, wherein:

the internal combustion engine includes a post-processing device in an exhaust passage;

the open-loop process is a temperature raising process of raising a temperature of the post-processing device and includes a rich combustion process; and the rich combustion process is a process of making an air-fuel ratio of an air-fuel mixture inside the other cylinders lower than a stoichiometric air-fuel ratio.

9. A control method of an internal combustion engine applied to the internal combustion engine having a plurality of cylinders and including a fuel injection valve that supplies fuel to the cylinders, comprising:

calculating a base value of an injection amount injected by the fuel injection valve that supplies fuel to the cylinders;

operating the fuel injection valve so as to inject fuel in an amount according to the base value;

giving feedback for correcting an injection amount resulting from operation of the injection valve with respect to the base value to perform feedback control and bring an air-fuel ratio of an air-fuel mixture inside the cylinders of the internal combustion engine to a target value;

determining whether or not an amount of other fuel flowing into the cylinders other than fuel injected from the fuel injection valve is equal to or larger than a threshold value; and not injecting fuel from the fuel injection valve with the feedback stopped, when it is determined as a result of the determination that the amount of fuel flowing into the cylinders other than fuel injected from the fuel injection valve is equal to or larger than the threshold value.

* * * * *